United States Patent
Lewis et al.

(10) Patent No.: US 8,082,707 B1
(45) Date of Patent: Dec. 27, 2011

(54) AIR-FILM VIBRATION DAMPING APPARATUS FOR WINDOWS

(75) Inventors: Thomas M. Lewis, Hamilton, OH (US); Michael L. Parin, Mishawaka, IN (US)

(73) Assignee: Damping Technologies, Inc., Mishawaka, IN (US)

( * ) Notice: Subject to any disclaimer, the term of this patent is extended or adjusted under 35 U.S.C. 154(b) by 1022 days.

(21) Appl. No.: 11/580,791

(22) Filed: Oct. 13, 2006

(51) Int. Cl.
  *B64C 1/14* (2006.01)
  *E06B 3/66* (2006.01)
  *F16F 7/00* (2006.01)

(52) U.S. Cl. ............. 52/204.593; 52/786.12; 244/129.3; 296/96.14; 181/207; 181/208

(58) Field of Classification Search ............. 52/204.593, 52/786.1, 786.11, 786.12; 244/129.3; 296/96.14
See application file for complete search history.

(56) References Cited

U.S. PATENT DOCUMENTS

| | | | |
|---|---|---|---|
| 2,444,976 A * | 7/1948 | Brown | 359/361 |
| 2,473,616 A * | 6/1949 | Stephenson | 244/129.3 |
| 2,912,724 A * | 11/1959 | Wilkes | 52/302.3 |
| 3,191,240 A * | 6/1965 | Slaman et al. | 52/204.5 |
| 3,343,317 A * | 9/1967 | Cripe | 52/208 |
| 3,953,630 A * | 4/1976 | Roberts et al. | 428/38 |
| 4,316,404 A * | 2/1982 | Medlin | 89/36.08 |
| 4,333,292 A * | 6/1982 | Musgrave | 52/404.2 |
| 4,460,314 A | 7/1984 | Fuller | |
| 4,622,249 A | 11/1986 | Bowser | |
| 4,776,763 A | 10/1988 | Light | |
| 4,829,729 A | 5/1989 | Derner et al. | |
| 4,932,608 A * | 6/1990 | Heidish et al. | 244/129.3 |
| 4,941,302 A * | 7/1990 | Barry | 52/171.3 |
| 5,005,557 A * | 4/1991 | Bachli | 126/572 |
| 5,009,218 A * | 4/1991 | Bachli | 126/714 |
| 5,120,584 A * | 6/1992 | Ohlenforst et al. | 428/34 |
| 5,154,953 A * | 10/1992 | de Moncuit et al. | 428/34 |
| 5,169,694 A * | 12/1992 | Endo et al. | 428/34 |
| 5,227,206 A * | 7/1993 | Bachli | 428/34 |

(Continued)

FOREIGN PATENT DOCUMENTS

EP  0 047 725 A1 * 3/1982

(Continued)

OTHER PUBLICATIONS

Chow, L.C. and Pinnington, R.J., "Practical Industrial Method of Increasing Structural Damping in Machinery, 1: Squeeze-Film Damping With Air," Journal of Sound and Vibration, 1987, vol. 118(1), pp. 123-139.

(Continued)

*Primary Examiner* — Robert Canfield
(74) *Attorney, Agent, or Firm* — Frederick H. Gribbell

(57) ABSTRACT

An improved vibration damping apparatus is provided for use with window structures, including windows used in vehicles, aircraft, and spacecraft. The vibration damping system includes at least two separate layers of solid material that are typically substantially clear at visible wavelengths, in which the two layers are spaced-apart by a predetermined distance to form a space or gap therebetween. This gap will be of a size and shape to enhance vibration damping when it is filled with a gaseous compound, such as air. The air-film vibration damping system created by the above structure can be applied to an external pane of a window structure, or to the interior pane of a window structure, or perhaps to both an exterior pane and an interior pane of the same window structure, if desired.

7 Claims, 7 Drawing Sheets

U.S. PATENT DOCUMENTS

| | | | |
|---|---|---|---|
| 5,232,344 | A | 8/1993 | El-Aini |
| 5,271,581 | A * | 12/1993 | Irish ........................ 244/129.3 |
| 5,343,619 | A | 9/1994 | Lardellier |
| 5,407,321 | A | 4/1995 | Rimkunas et al. |
| 5,584,662 | A | 12/1996 | Mannava et al. |
| 5,766,755 | A * | 6/1998 | Chaussade et al. ........... 428/332 |
| 5,820,343 | A | 10/1998 | Kraft et al. |
| 5,820,348 | A | 10/1998 | Fricke |
| 5,846,057 | A | 12/1998 | Ferrigno et al. |
| 6,155,789 | A | 12/2000 | Mannava et al. |
| 6,199,933 | B1 * | 3/2001 | Gielda ...................... 296/96.14 |
| 6,203,269 | B1 | 3/2001 | Lorber et al. |
| 6,224,339 | B1 | 5/2001 | Rhodes et al. |
| 6,224,341 | B1 | 5/2001 | Fricke |
| 6,238,187 | B1 | 5/2001 | Dulaney et al. |
| 6,328,532 | B1 | 12/2001 | Hahnle |
| 6,514,040 | B2 | 2/2003 | Lewis et al. |
| 6,787,204 | B2 * | 9/2004 | Chaussade et al. ............ 428/34 |
| 6,793,990 | B1 * | 9/2004 | Sakaguchi et al. ............ 428/34 |
| 6,905,094 | B2 * | 6/2005 | Dazet et al. ................ 244/129.3 |
| 7,552,896 | B2 * | 6/2009 | Coak ........................ 244/129.3 |
| 7,721,844 | B1 * | 5/2010 | Lewis et al. ................ 181/207 |
| 2003/0234322 | A1 * | 12/2003 | Bladt et al. ................ 244/129.3 |
| 2004/0238690 | A1 * | 12/2004 | Wood et al. ................ 244/129.3 |
| 2007/0069080 | A1 | 3/2007 | Rassaian et al. |

FOREIGN PATENT DOCUMENTS

| | | |
|---|---|---|
| FR | 889568 | 1/1943 |
| GB | 2 026 622 A | 2/1980 |
| JP | 61181794 | 8/1986 |

OTHER PUBLICATIONS

Fox, M.J.H. and Whitton, P.N., "The Damping of Structural Vibration by Thin Gas Films," Journal of Sound and Vibration, 1980, vol. 73(2), pp. 279-295.

Chow, L.C. and Pinnington, R.J., "Practical Industrial Method of Increasing Structural Damping in Machinery, II: Squeeze-Film Damping With Liquids," Journal of Sound and Sound Vibration, 1989, vol. 128(2), pp. 333-347.

Jones, D.I.G., Lewis, T., and Michael, C., "Partial Coverage Air Film Damping of Cantilever Plates," Journal of Sound and Vibration, 1997, vol. 208(5), pp. 869-875.

International Search Report, 01901805.0-2315-PCT/US01/00408, Apr. 28, 2004, 4 pages.

* cited by examiner

AIR-FILM VIBRATION DAMPING APPARATUS FOR WINDOWS

TECHNICAL FIELD

The present invention relates generally to vibration damping equipment and is particularly directed to air-film damping devices of the type which can damp mechanical and/or acoustic vibrations in windows. The invention is specifically disclosed as an aircraft window damping system that employs air-film damping technology to increase damping in the window structure.

BACKGROUND OF THE INVENTION

Windows of vehicles and aircraft typically have a relatively large surface area and, therefore, have good acoustic radiation efficiency. The resonance response of such window structures results in significant vibration and acoustic energy which typically contributes significantly to the interior noise in automobiles or other vehicles, and in aircraft cabins. Particularly for aircraft, turbulent air flow at the exterior surfaces of the fuselage skin and the exterior surfaces of the windows tends to excite these resonances.

In typical conventional aircraft, the windows have low-to-moderate inherent damping. An efficient countermeasure for the resonance response of a structure is to increase the effective damping, and in the case of windows, the optical quality of the window typically should be substantially maintained. It may be permissible to degrade the optical quality by a small amount, or perhaps for small surface areas, but in general the optical quality should not noticeably vary if damping is added to a window structure.

One conventional aircraft window is depicted in FIG. 1, generally designated by the reference numeral 10. This window structure 10 has an outer pane 12 that comprises stretched acrylic material, about 0.31 inches in thickness. A second pane 14 is also made of stretched acrylic material, and in this structure it is about 0.19 inches in thickness. Between the two panes 12 and 14 is an air gap, generally designated by the reference numeral 18. In this particular window structure the air gap is about 0.26 inches across, which is the distance that these two panes are spaced-apart from one another.

The edges of these two panes 12 and 14 are coated and sealed by silicone material, at 16. The window 10 is an example of a structure seen in some contemporary commercial passenger aircraft. In conventional windows as depicted in FIG. 1, the thicker pane 12 is the exterior pane for the window, while the thinner pane 14 faces the interior of the fuselage or cabin. In many of the conventional windows such as this, the interior pane 14 has a vent hole that tends to equalize the pressure on both sides of the pane 14.

A second type of aircraft window is depicted in FIG. 2, generally designated by the reference numeral 20. A first pane of material at 22 is made of thermal tempered glass, about 0.50 inches in thickness. This is the thicker pane, which could face (be in contact with) the environment to the exterior of the aircraft, or it could be used as the inner window structure, i.e., as the interior cabin pane. A second pane of thermal tempered glass is located at 24, and in this conventional window 20, the pane 24 is about 0.19 inches in thickness. Even though this pane 24 is less thick, it may be used as an exterior pane if desired, and it can be coated with a rain repellent coating on its outermost surface.

Instead of an air gap, a vinyl interlayer 26 separates the two glass panes 22 and 24. In this window 20, the vinyl interlayer is about 0.38 inches in thickness. There are also two urethane interlayers 28 that are about 0.02 inches in thickness. One of the urethane interlayers is between the outer pane 24 and the vinyl interlayer 26, while a second urethane interlayer is between the interior glass pane 22 and the vinyl interlayer 26. This window structure 20 also includes a conductive heating film 23 that is located on the inboard surface of the glass ply (or pane) 24.

The conventional window 20 includes other supporting structures that hold together the layers described above. A stainless steel Z-bar is positioned at 30, and tends to hold in place the outer glass pane 24 and the vinyl interlayer 26, in which a layer of sealant is disposed therebetween. The sealant layer is generally disposed at 32, and may comprise a type of sealant known as "PR 1425."

An aluminum spacer member 40 is used as a support for the entire window structure 20. A silicone gasket 34 is placed on the outer surface of the Z-bar 30 and the aluminum spacer member 40. A metal insert 42 is placed within the vinyl interlayer 26, and makes contact with the aluminum spacer member 40. An edge filler structure made of phenolic is illustrated at 44, which tends to hold the inner pane 22 in place with the spacer member 40 and the vinyl interlayer 26.

Both of the conventional windows described above do not use any particular form of air-film vibration damping. The window structure 10 of FIG. 1 has a large air gap 18 which would not be particularly useful for air-film vibration damping, while the window structure 20 of FIG. 2 has no particular air gap at all.

It would be an improvement to add a form of vibration damping (or acoustic radiation damping) to the windows of vehicles and aircraft (or spacecraft for that matter). The higher the speed of the vehicle/aircraft/spacecraft, the more important that sufficient vibration damping of window structures may become.

SUMMARY OF THE INVENTION

Accordingly, it is an advantage of the present invention to provide a vibration damping system that can reduce the acoustic energy and/or vibrational energy of window structures, including windows used in vehicles, aircraft, spacecraft, and even vessels.

It is another advantage of the present invention to provide a vibration damping system in which a space is formed between two layers of material in a window structure, in which this space has predetermined dimensions to enhance air-film vibration damping of acoustic energy and/or vibrational energy in the window structure.

It is still another advantage of the present invention to provide a vibration damping system for window structures which uses a gaseous material as a vibration damping medium, within a space of predetermined dimensions that is part of the window structure.

It is a further advantage of the present invention to provide a vibration damping system for window structures using a gaseous material within a space of predetermined dimensions, and in which at least a portion of the window structure is essentially optically clear, whereas a portion of the window structure may not be substantially clear at optical wavelengths.

It is still a further advantage of the present invention to provide a vibration damping system for window structures that includes a predetermined space between at least two layers of window structure material, in which one of the window structures exhibits an opening that extends completely therethrough for pressure equalization.

It is yet a further advantage of the present invention to provide a vibration damping system for window structures that includes a space of a predetermined dimension between at least two window structures, in which the space has a gaseous material therewithin, and in which the gaseous material is pressurized.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a vibration damping system is provided, which comprises: a first window structure; a second window structure that is spaced-apart from the first window structure by a first distance, in an arrangement by which at least portions of the first and second window structures are substantially parallel to one another; wherein the first window structure comprises a single layer of material that is substantially transparent at optical wavelengths for humans; wherein the second window structure comprises two separate layers of material that are both substantially transparent at visible optical wavelengths for humans, the two separate layers being spaced-apart from one another by a second distance in an arrangement by which at least portions of the two separate layers are substantially parallel to one another, thereby forming a space between the two separate layers of material of the second window structure in which the space includes a gaseous material; and wherein the second distance is significantly less than the first distance, and the second distance is of a size that provides air-film vibration damping for the second window structure.

In accordance with another aspect of the present invention, a vibration damping system is provided, which comprises: a first window structure; a second window structure that is spaced-apart from the first window structure by a first distance, in an arrangement by which the first and second window structures are substantially parallel to one another; wherein the first window structure comprises a first grouping of two separate layers of material that are both substantially transparent at visible optical wavelengths for humans, the first grouping of two separate layers being spaced-apart from one another by a second distance in an arrangement by which at least portions of the first grouping of two separate layers are substantially parallel to one another, thereby forming a first space between the first grouping of two separate layers of material of the first window structure in which the first space includes a gaseous material; wherein the second window structure comprises a second grouping of two separate layers of material that are both substantially transparent at visible optical wavelengths for humans, the second grouping of two separate layers being spaced-apart from one another by a third distance in an arrangement by which at least portions of the second grouping of two separate layers are substantially parallel to one another, thereby forming a second space between the second grouping of two separate layers of material of the second window structure in which the second space includes a gaseous material; and wherein the second distance is significantly less than the first distance, the third distance is significantly less than the first distance, the second distance is of a size that provides air-film vibration damping for the first window structure; and the third distance is of a size that provides air-film vibration damping for the second window structure.

In accordance with yet another aspect of the present invention, a vibration damping system is provided, which comprises: a window structure that comprises two separate layers of material that are both substantially transparent at visible optical wavelengths for humans, the two separate layers being spaced-apart from one another by a first distance in an arrangement by which at least portions of the two separate layers are substantially parallel to one another, thereby forming a space between the two separate layers of material of the window structure in which the space includes a gaseous material; wherein the first distance is less than one-quarter inch (6.3 mm) so as to provide air-film vibration damping for the window structure.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
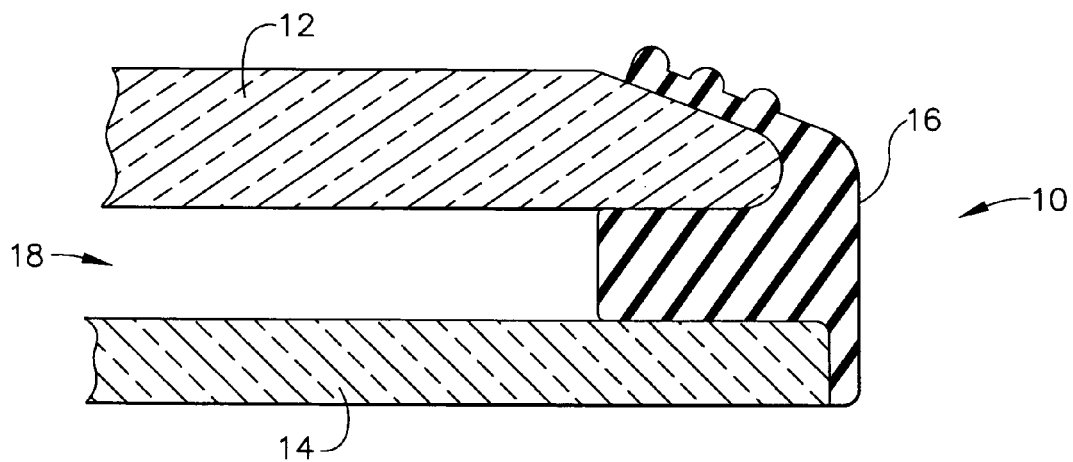
FIG. 1 is a view looking parallel to the plane of a conventional aircraft window, in cross-section.
Figure 2:
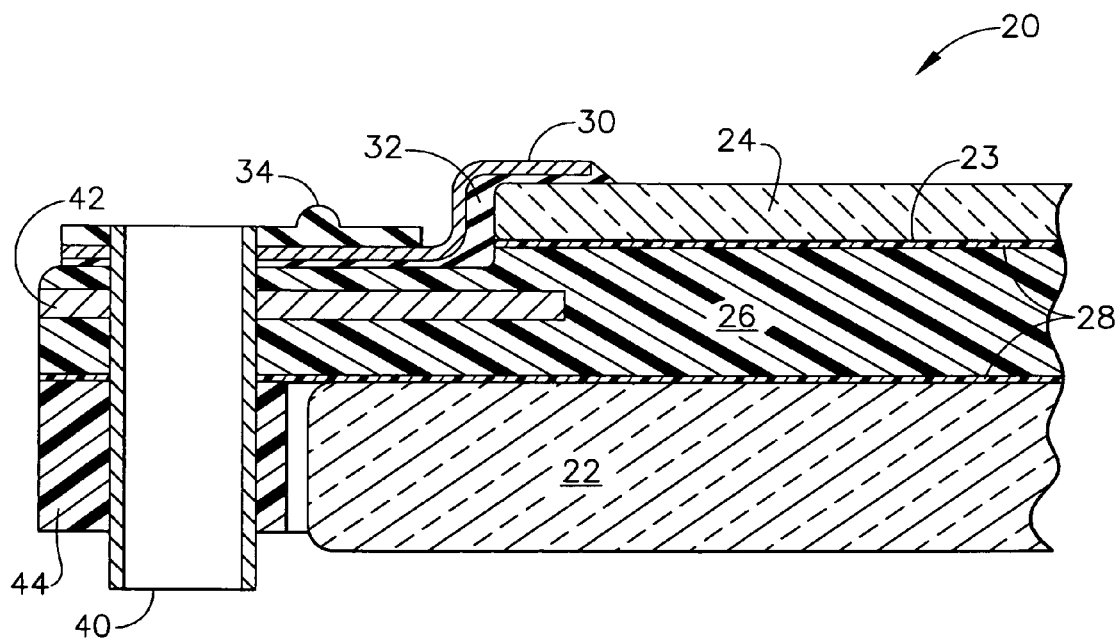
FIG. 2 is a view looking parallel to the plane of a different style conventional aircraft window, in cross-section.
Figure 3:
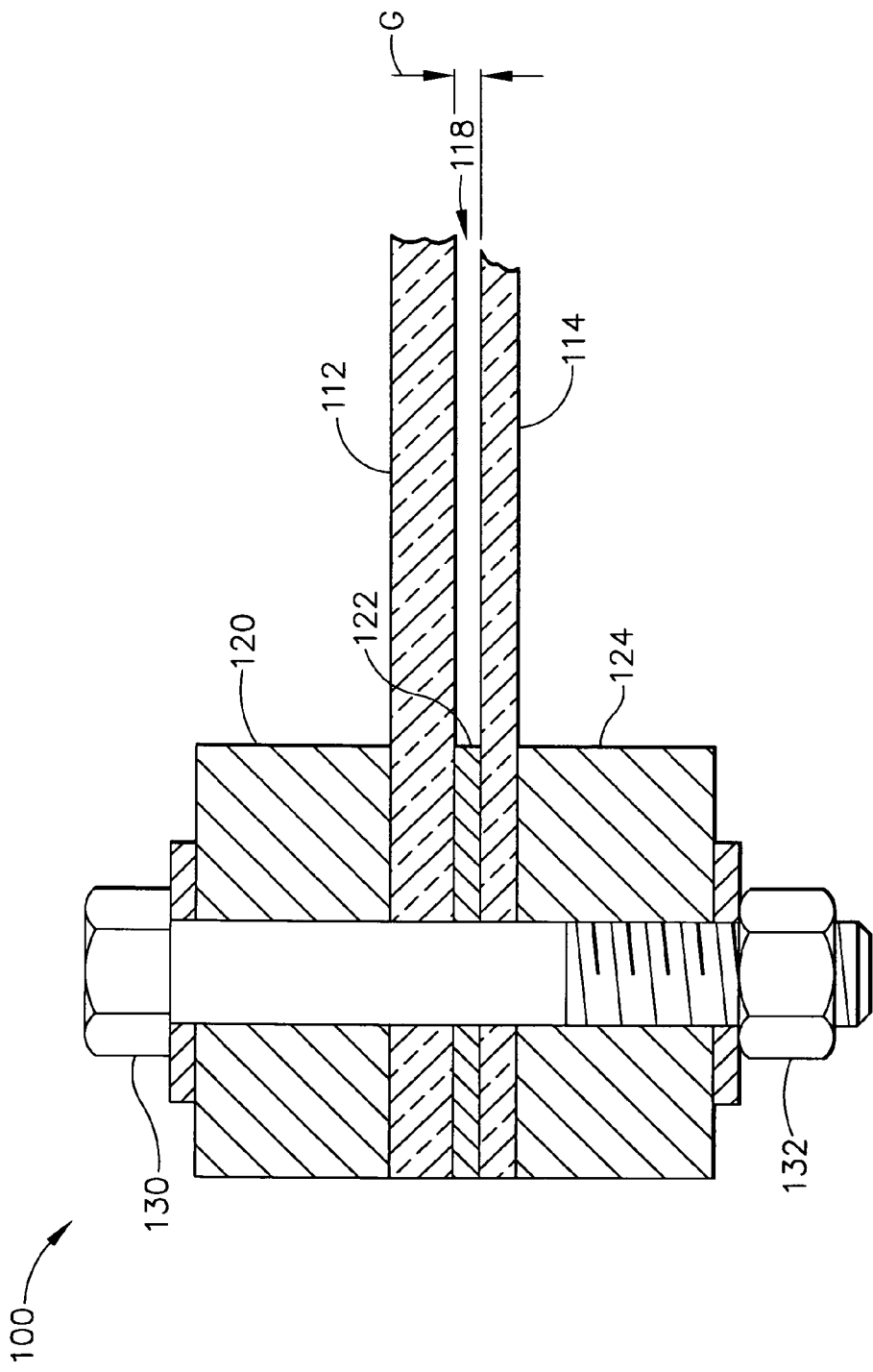
FIG. 3 is a view in cross-section of a test fixture holding a window constructed according to the principles of the present invention, looking down the plane of the window.

Referring now to FIG. 3, a window structure generally designated by the reference numeral 100 is depicted in a configuration in which it could be used as a window in an aircraft fuselage. In FIG. 3, a test fixture is used to hold various portions of the window structure together, in which the test fixture simulates the side or edge structural members of an aircraft window as part of the fuselage of the aircraft.

A first window pane 112 is constructed substantially in parallel to a second spaced-apart window pane (or platelet) 114. The spaced-apart relationship results in a gap 118 between the two surfaces that face each other of the window panes 112 and 114. In this example embodiment, the window pane 112 is made of cast acrylic sheet material, about 0.36 inches in thickness, and the window pane 114 is made of cast acrylic sheet of about 0.105 inches in thickness. Note, however, that the thickness of pane 114 can be made either lesser or greater, for use in the present invention. For example, the thickness of pane 114 could be in the range of 0.050 inches (1.27 mm) to 1.00 inches (25.4 mm); thicknesses outside this range are also possible.

The gap 118 will have a dimension "G" that is related to appropriate air-film vibration damping of acoustic energy and/or mechanical vibrations that otherwise would be generated in these window structures. In one exemplary embodiment, this gap 118 could be as small as 0.006 inches; however, other gap dimensions also will work well for this invention. For example, the dimension G of gap 118 could be in the range of 0.001 inches (0.025 mm) to 0.050 inches (1.27 mm), inclusive; gap distances outside this range are also possible, for example up to one-quarter inch (6.3 mm). In FIG. 3, the dimension G of the gap 118 is controlled by an aluminum shim 122 that is provided as part of the test fixture.

The rest of the test fixture in FIG. 3 comprises a first aluminum boundary frame 120 and a second aluminum boundary frame 124, that are both held together and abutted by a rather large nut and bolt, in which the bolt is depicted at 130 and the nut at 132.

It will be understood that the types of materials used for windows according to the vibration damping system of the present invention can vary considerably as desired by the system designer, without departing from the principles of the present invention. Moreover, the aluminum members of the test fixture depicted in FIG. 3 are simply used to provide rigid support for the window structure members, and other sizes and shapes of materials could be used, and moreover other types of materials could be used, all without departing from the principles of the present invention. Several examples are discussed below.

It will also be understood that the gaseous compound(s) used within the "air gap" 118 do not necessarily have to be atmospheric air. For example, in jet aircraft flying at high altitudes, the "air gap" may have a pressure equalizer structure (e.g., a small opening) to the internal cabin pressure, and in that situation the gas within air gap 118 would comprise the enriched oxygen used in pressurized aircraft cabins. Even if the "air gap" is completely sealed, the gas used therein may comprise elements or compounds that do not meet the normal definition of atmospheric air, but would still fall within the principles of the present invention. Therefore, in this patent document, a reference to the "air" within this space or "air gap" are not restricted to typical "air" compounds.

Figure 4A:
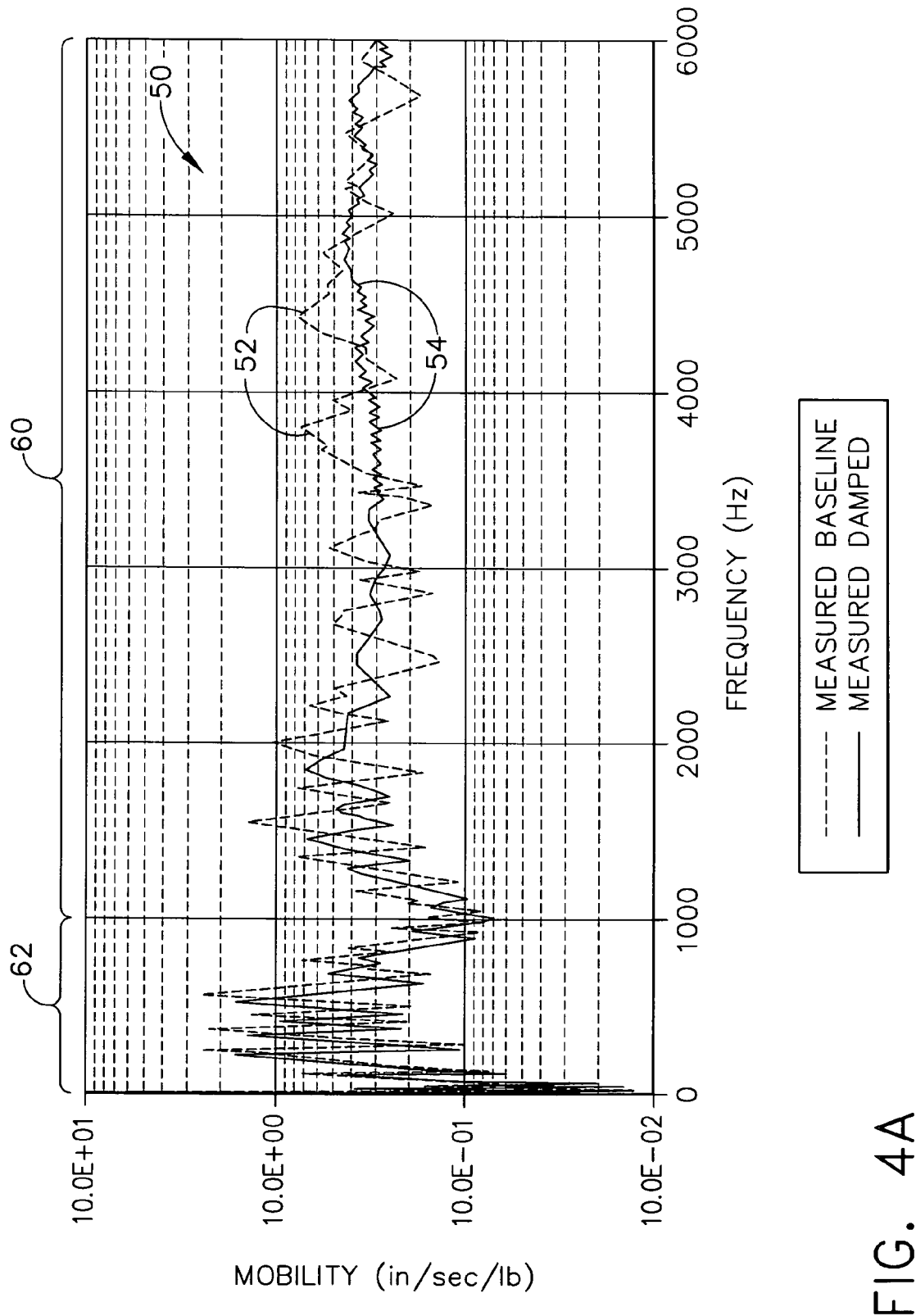
FIG. 4A is a graph showing a frequency response of vibrational mobility of a first curve showing the response of a conventional window as a measured baseline, and a second curve showing the response of a first example window constructed according to the principles of the present invention as a "measured damped-outboard" structure.

Referring now to FIG. 4A, a graph of mobility (in inches per second per pound) versus frequency (in Hz) is illustrated for a first example window structure constructed according to the principles of the present invention. The overall graph is generally depicted by the reference numeral 50, in which one of the curves (i.e., reference numeral 52) represents the mobility of a baseline window structure that is constructed according to conventional means and materials, and a second curve 54 that represents the mobility of a damped window structure that is similar to that depicted in FIG. 3, along with the test fixture of FIG. 3. In the graph 50, a specific test was performed assuming that the window structure 114 was associated with an one of the panes of an aircraft window in an aircraft fuselage.

As can be seen from inspecting the curves 52 and 54 of graph 50, there is a significant reduction of the vibrational mobility in the frequency range of zero Hertz to 6,000 Hz, particularly in the range between 1,000 Hz and 6,000 Hz. This range is indicated by the reference numeral 60 on FIG. 4A. The lower frequencies, in the range from zero to 1,000 Hz, also exhibit improvement in the measured vibrational mobility characteristics of this window structure, which is represented by the reference numeral 62 on FIG. 4A.

The graph 50 does not extend higher than 6,000 Hz, however, the air-film vibration damping technology of the present invention can significantly increase the vibration damping in such window structures at higher frequencies as well, including through a frequency range of zero Hz through 15,000 Hz, inclusive. This provides significant reduction of vibration and acoustic noise in a major portion of the human hearing range. The air-film vibration damping system provides a damping mechanism related to the relative transverse cyclic motion (due to modal velocities) between upper and lower structure surfaces, above and below a thin gap that is filled with a gaseous substance, such as air. The transverse cyclic motion forces the gas to cyclically flow within the gap, and the air flow essentially becomes viscous if the gap dimensions are chosen appropriately. The cyclic pressure variations arising from this air flow provide the damping mechanism. Similar air-film vibration damping systems have been successfully demonstrated in other types of structures, including aircraft turbine engine fan blades (see U.S. Pat. No. 6,514,040 co-assigned to Damping Technologies, Inc. of Mishawaka, Ind., which is incorporated herein by reference in its entirety). It should be noted that the typical speech interference level (SIL) frequency range is 355 Hz to 5,600 Hz. As can be seen from the above, the air-film vibration damping provided by the vibration damping system of the present invention can be of major benefit for a large portion of this SIL range.

Figure 4B:
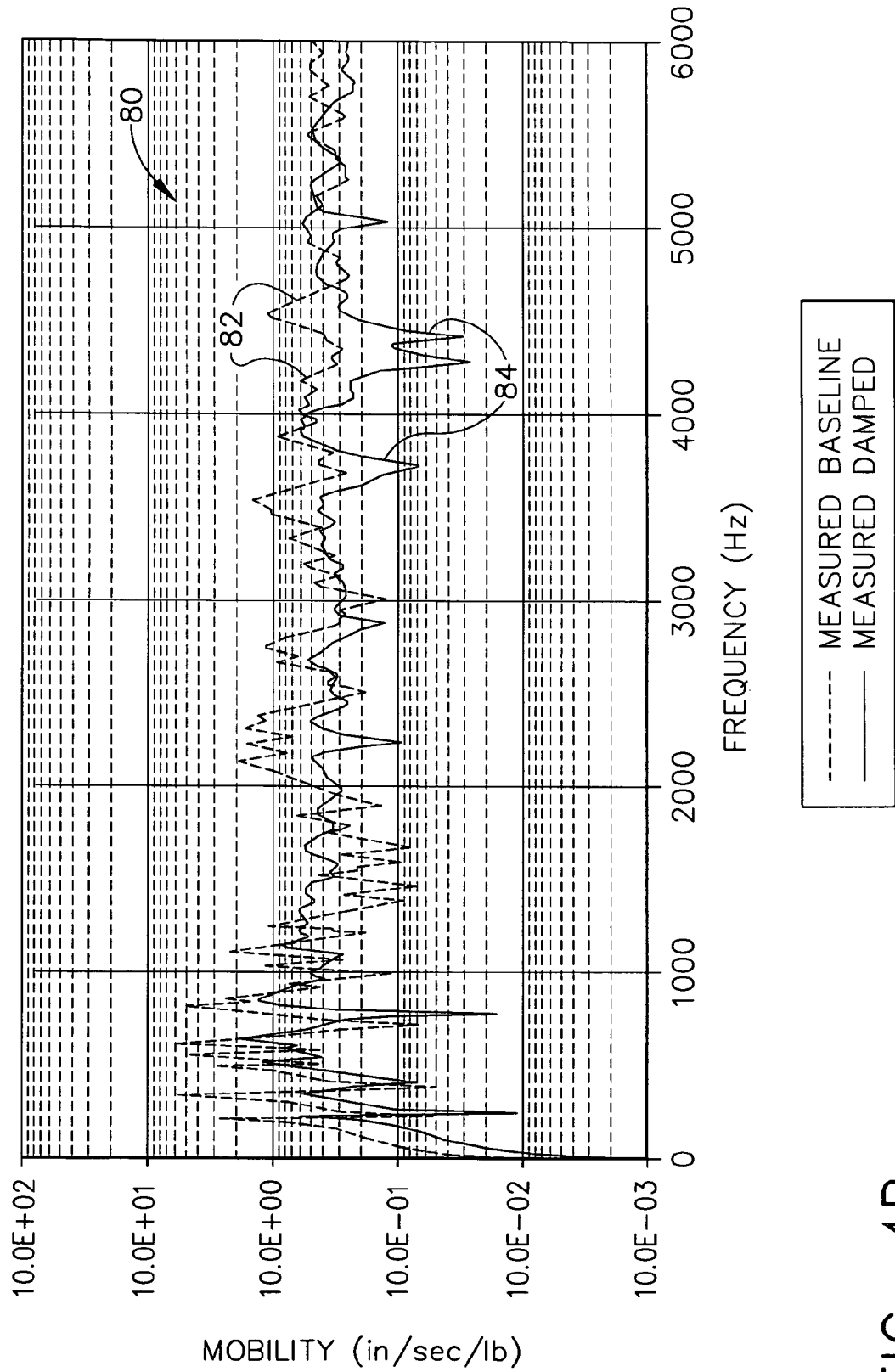
FIG. 4B is a graph showing a frequency response of vibrational mobility of a second curve showing the response of a conventional window as a measured baseline, and a second curve showing the response of a second example window constructed according to the principles of the present invention as a "measured damped-inboard" structure.

Referring now to FIG. 4B, a graph of mobility (in inches per second per pound) versus frequency (in Hz) is illustrated for a second example window structure constructed according to the principles of the present invention. The overall graph is generally depicted by the reference numeral 80, in which one of the curves (i.e., reference numeral 82) represents the mobility of a baseline window structure that is constructed according to conventional means and materials, and a second curve 84 that represents the mobility of a damped window structure that is similar to that depicted in FIG. 3, along with the test fixture of FIG. 3. In the graph 80, a specific test was performed assuming that the window structure 114 was associated with one of the panes of an aircraft window in an aircraft fuselage. Note that this graph 80 is based on a window structure with different dimensional characteristics (as discussed below) than the window structure that was the basis for the graph 50 (of FIG. 4A). Moreover, the window material for panes 112 and 114 was clear polycarbonate for the test results of graph 80.

As can be seen from inspecting the curves 82 and 84 of graph 80, there is a significant reduction of the vibrational mobility in the frequency range of zero Hertz to 6,000 Hz. The attenuation in vibrational mobility ranges from a factor of about 5.0 to a factor of about 10.0, as a reduction in this mobility for resonances in the low frequency range. Similar attenuation also can be seen for particular high-order dynamics in the FRF (frequency response function) spectrum. It is anticipated that such attenuation will yield significant benefits in the sound pressure radiated from the window structure.

The graph 80 does not extend higher than 6,000 Hz, however, the air-film vibration damping technology of the present invention can significantly increase the vibration damping in such window structures at higher frequencies as well, including through a frequency range of zero Hz through 15,000 Hz, inclusive. As discussed above, this provides significant reduction of vibration and acoustic noise in a major portion of the human hearing range.

Figure 5:
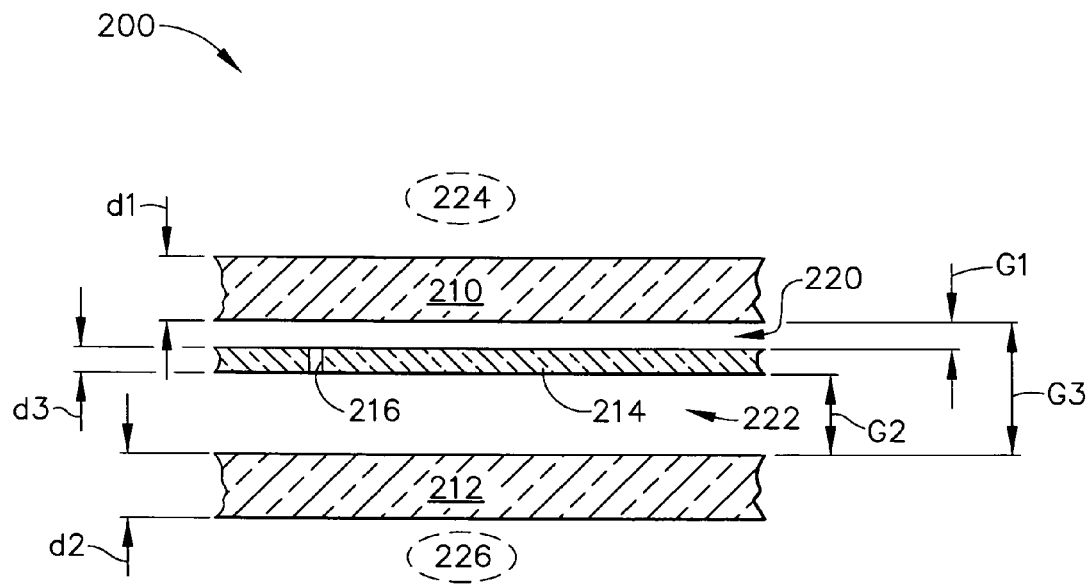
FIG. 5 is a cross-section view of a window constructed according to the principles of the present invention, looking down the plane of the window structure, in which an intermediate window pane is positioned near an exterior window pane, thereby forming a vibration damping system using air-film vibration damping according to the present invention.

Referring now to FIG. 5, a window vibration damping structure generally designated by the reference numeral 200 is illustrated as having a first pane of glass (or other substantially transparent material) 210, a second pane of glass (or other substantially transparent material) 212, and a third intermediate layer of material 214. In this FIG. 5, the pane 210 is considered to be the exterior structure, and is in communication with outside air (i.e., the exterior environment) represented by the reference numeral 224. The inner pane is at 212, and if this window structure 200 is part of an aircraft fuselage, the space at reference numeral 226 would be the interior cabin air within the fuselage.

In FIG. 5, the intermediate layer 214 is positioned proximal to the outer pane 210, and is spaced-apart by a gap at reference numeral 220. There is a larger gap 222 between the interior pane 212 and the intermediate pane or structure 214. The gap between the outer pane 210 and the intermediate pane 214 is referred to as "G1", the gap between the intermediate pane 214 and the interior pane 212 is referred to as "G2", and the overall gap between the two main window structural members 210 and 212 is given by the gap dimension "G3".

The thickness of the exterior pane (or window structure) 210 is given by the dimension "d1" on FIG. 5, the thickness of the interior pane (or window structure) 212 is given by the dimension "d2", while the thickness of the intermediate pane (or structure) 214 on FIG. 5 is given by the dimension "d3".

In a first exemplary embodiment of the present invention, the thickness of the pane 210 could be about 0.36 inches (i.e., dimension d1), and the thickness of the interior pane 212 could also have a thickness of about 0.36 inches (the dimension d2). The thickness of the intermediate member 212 could have a dimension of about 0.105 inches (2.7 mm), i.e., at dimension d3. The gap G1 could have a dimension of about 0.005 to 0.006 inches (0.127 mm to 0.152 mm), and the overall "gap" G3 could be about 0.5 inches. This would then leave a gap dimension G2 of about 0.389 to 0.390 inches.

With these dimensions (of the first exemplary embodiment), this type of structure could provide results similar to the frequency response illustrated in the graph 50 of FIG. 4A, for a window size of about 20×20 inches. The "gap" dimension G1 represents a predetermined dimension or distance that creates a narrow space or volume that is designed to provide additional vibration damping characteristics by the installation of the intermediate member 214 in fairly close proximity to the exterior glass or acrylic (or other substance) member 210.

In actual use, the intermediate (or third) layer of material 214 would likely have a vent hole (e.g., at 216) to allow pressure to equalize on both sides of its structure, i.e., the areas at reference numerals 220 and 222. As can be seen from the above dimensional information, this layer 214 will typically be fairly "thin" in construction, and thus will not be expected to carry a differential pressure loading. The relative "thinness" of element 214 will usually aid in providing the air-film damping characteristic for this window structure 200.

In a second exemplary embodiment of the present invention, the thickness of the pane 210 could be about 0.36 inches (i.e., dimension d1), and the thickness of the interior pane 212 could also have a thickness of about 0.36 inches (the dimension d2). The thickness of the intermediate member 214 could have a dimension of about 0.210 to 0.214 inches (5.3 mm to 5.4 mm), i.e., at dimension d3. The gap G1 could have a dimension of about 0.016 inches (4.1 mm), and the overall "gap" G3 could be about 0.5 inches. This would then leave a gap dimension G2 of about 0.270 to 0.274 inches.

With these dimensions (of the second exemplary embodiment), this type of structure could provide results similar to the frequency response illustrated in the graph 50 of FIG. 4B, for a window size of about 11×16 inches. As above, the "gap" dimension G1 represents a predetermined dimension or distance that creates a narrow space or volume that is designed to provide additional vibration damping characteristics by the installation of the intermediate member 214 in fairly close proximity to the exterior member 210.

It will be understood that all of the dimension described above in reference to FIG. 5 could be substantially different for various different types of materials used, or for various differences in overall dimensions for window size, or for application in a vehicle as compared to an aircraft or a spacecraft, for example. Obviously, the faster the vehicle or aircraft/spacecraft, the stronger the structural members must be, particularly the outer pane or window member 210. This could significantly impact the other structural members, including their dimensions (such as their thicknesses) as well as their spaced-apart relationships with each other, including the gap dimension G1.

It will also be understood that the intermediate member or layer 214 would typically be made of a substantially transparent material at human optical wavelengths. However, certain portions of member 214 would not necessarily need to be optically transparent, perhaps at areas along its outer edges, for example.

Figure 6:
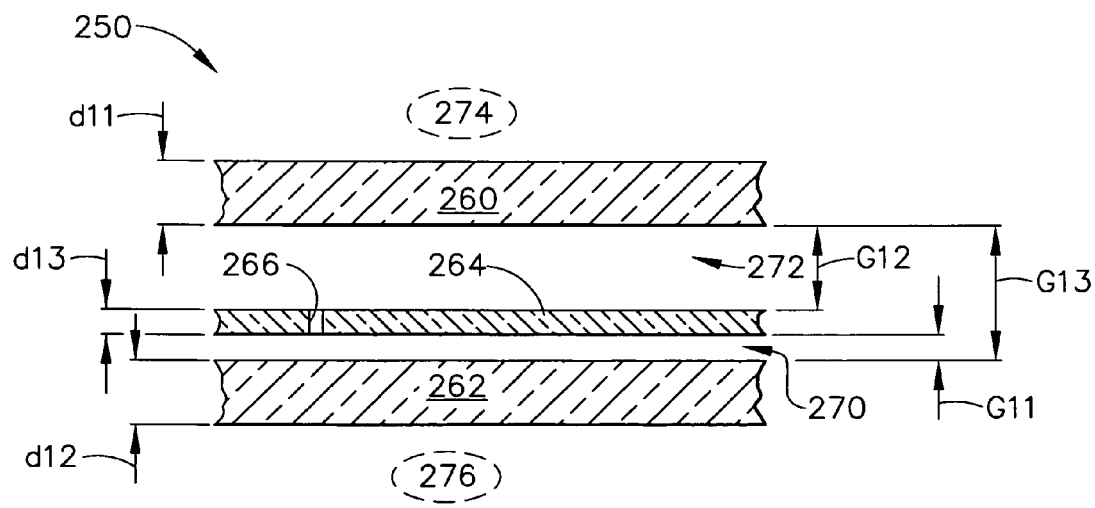
FIG. 6 is a cross-section view of a window constructed according to the principles of the present invention, looking down the plane of the window structure, in which an intermediate window pane is positioned near an interior window pane, thereby forming a vibration damping system using air-film vibration damping according to the present invention.

Referring now to FIG. 6, another window structure is generally designated by the reference numeral 250. In FIG. 6, the exterior window structural member is at 260, while the interior window structural member is at 262. An intermediate member 264 is located proximal to the interior window structural member 262 in this configuration. The air-film vibration damping characteristics will be provided by a gap or volume at 270, which relates to a dimension G11 with regard to its actual distance. A larger gap at 272 represents the distance between the intermediate member 264 and the outer structural member 260. The exterior air (or environment) is at 274, while the interior air (or environment) is at 276.

In FIG. 6, a dimension d11 represents the thickness of the outer window structural member 260, a dimension d12 represents the thickness of the interior window structural member 262, while a dimension d13 represents the thickness of the intermediate member 264. The gap dimension G11 is most important with regard to the vibration damping characteristics of this window structure 250, and a gap at G12 represents more of a thermal barrier. An overall gap dimension G13 represents the distance between the main window structural members 260 and 262.

In FIG. 6, the air-film vibration damping characteristics will be effective for the interior window member 262, rather than the exterior window member 260; there are differences in the implementations of the air film damping systems of structures 200 and 250. In the case of structure 200, the outer pane structure would be heavily damped via air film damping; in the case of structure 250, the inner pane structure would be heavily damped via air film damping. Even if all of the materials and dimensions were identical to the window structure 200 illustrated in FIG. 5, the acoustic frequency response with respect to the cabin interior and vibrational amplitude response would not necessarily be precisely the same, between these two structures 250 and 200, although they may have quite similar characteristics for their specific damped components.

In actual use, the intermediate layer of material 264 would likely have a vent hole (e.g., at 266) to allow pressure to equalize on both sides of its structure, i.e., the areas at reference numerals 270 and 272. As can be seen from the above dimensional information, this layer 264 will typically be fairly "thin" in construction, and thus will not be expected to carry a differential pressure loading. Moreover, the innermost pane structure 262 might also be vented, to avoid carrying any kind of pressure loading; this assumes that the outermost pane structure 260 will be the pressure load-bearing member of this window structure 250, which probably is typical in many aircraft fuselages. It will be understood that all of the various embodiments described herein may, or may not, have one or more vent holes (whether illustrated or not) through one or more of the window pane elements (or layers), including the element/layer that provides the air-film damping characteristic.

Figure 7:
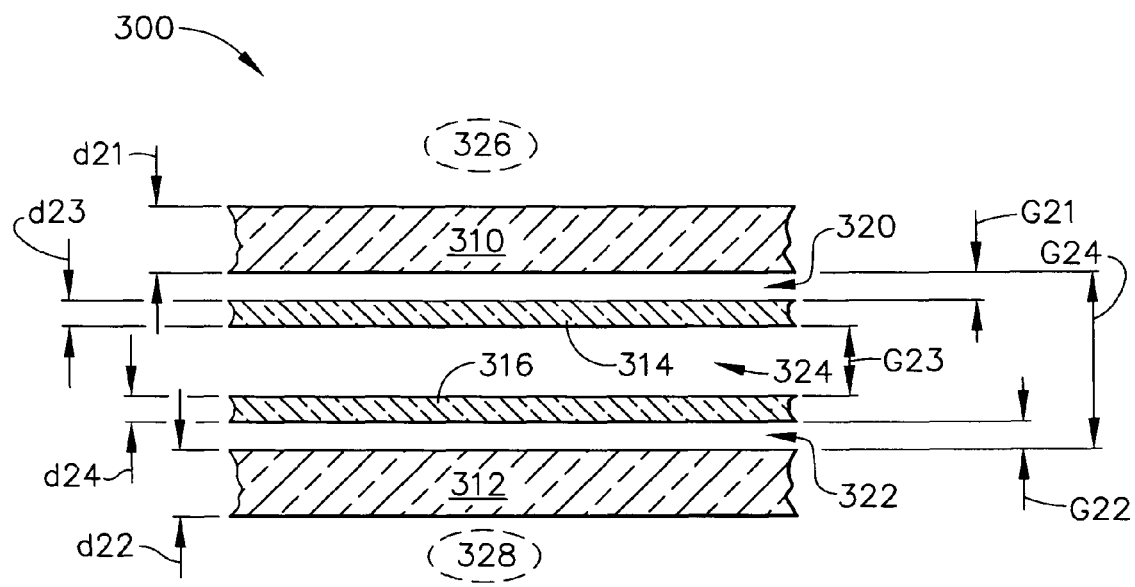
FIG. 7 is a cross-section view of a window constructed according to the principles of the present invention, looking down the plane of the window structure, in which a first intermediate window pane is positioned proximal to an exterior window pane to form a first vibration damping system, and a second intermediate pane is positioned proximal to an interior window pane, thereby forming a second vibration damping system, both using air-film vibration damping according to the present invention.

Referring now to FIG. 7, a window structural assembly 300 is depicted as having two main window structural members 310 and 312, and two intermediate members 314 and 316. The exterior environment is depicted at 326, while the interior environment is depicted at 328.

The two intermediate members 314 and 316 provide the capability of further damping the acoustic energy or vibrational energies of both main window structures 310 and 312. The outer window member 310 has an air-film vibration damping gap 320 with a gap dimension G21 between itself and the first intermediate member 314. The second intermediate member 316 provides an air-film vibration damping gap 322 that has a dimension G22 on FIG. 7 between itself and the second main member 312. There is a gap area (or volume) 324 between the two intermediate members 314 and 316. That gap dimension is designated G23, and the overall gap dimension G24 represents the distance between the two main structural members 312 and 310.

The thickness of the outer member 310 is given as d21, the thickness of the interior member 312 is given by the dimension d22. The thickness of the two intermediate members 314 and 316 are given by the dimensions d23 and d24, respectively. There is nothing in the present invention that says the thicknesses of the two intermediate members 314 and 316 must be equal in this configuration, nor do the distances in the gaps G21 and G22 necessarily need to be equal. Each of the window structural members 310 and 312 can have its own predetermined gap dimension to the respective intermediate members 314 and 316, and thus be "tuned" to have superior vibration damping characteristics regardless as to the other main window member.

Figure 8:
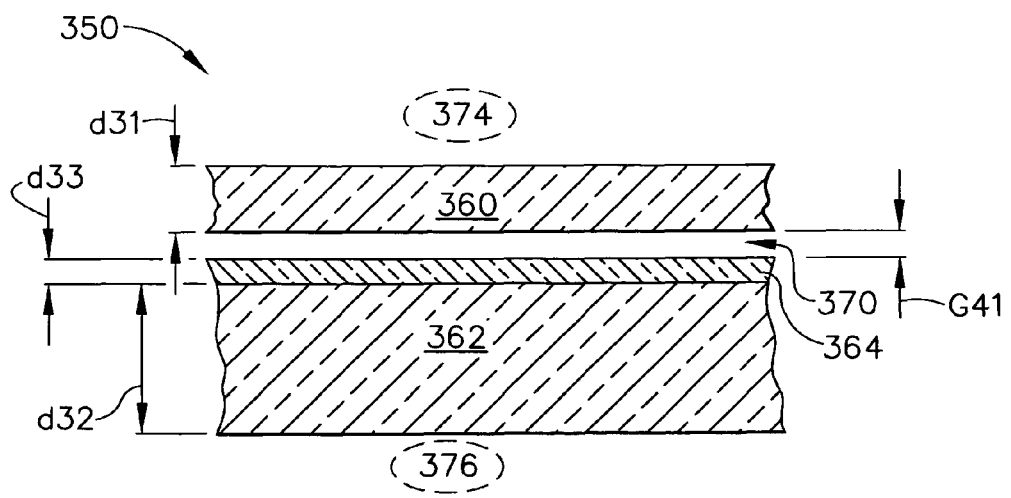
FIG. 8 is a cross-section view of a window constructed according to the principles of the present invention, in which an intermediate layer of material is positioned against an interior window structure, but is also positioned in a spaced-apart relationship to an exterior window pane, thereby forming an air-film vibration damping system according to the present invention.

Referring now to FIG. 8, another alternative window structure is generally designated by the reference numeral 350. There are two main window members, an exterior window member 360 and an interior window member 362. An intermediate layer 364 is illustrated as being in contact with the interior window member 362. The exterior environment is at 374, while the interior environment is at 376.

The only "gap" in the design of FIG. 8 is the space 370, which has a gap dimension designated G41. This would necessarily have to provide both air-film vibration damping characteristics as well as thermal insulation characteristics, and so this design of FIG. 8 may not be suitable for a large number of various applications involving vehicles or aircraft/spacecraft that travel through extremes of temperature. The thickness of the exterior window 360 is given at d31, the thickness of the interior window structure 362 is given at d32, and the thickness of the intermediate layer 364 is given at d33.

Figure 9:
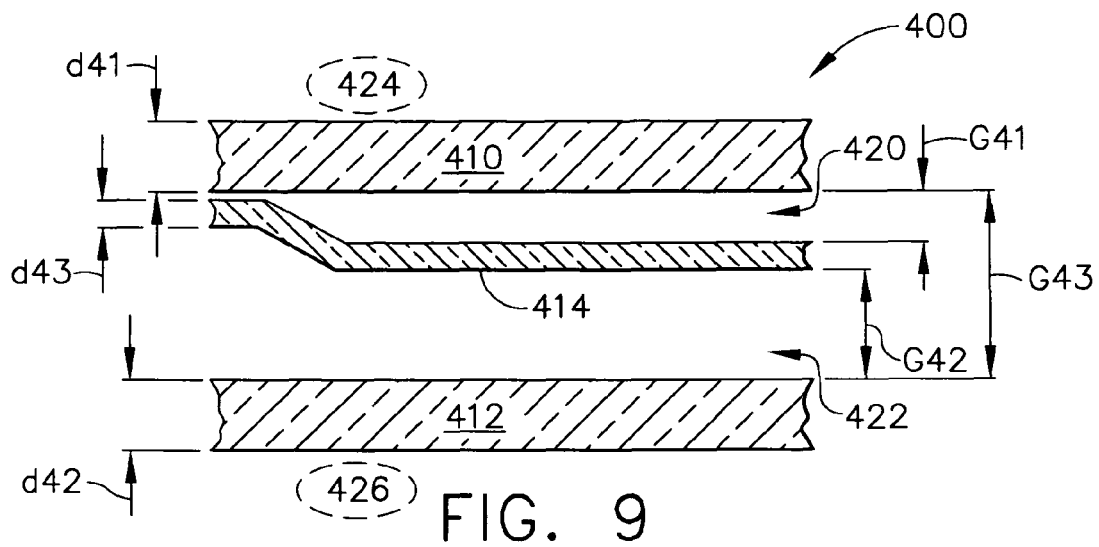
FIG. 9 is a cross-section view of a window constructed according to the principles of the present invention, in which an intermediate layer of material is positioned proximal to an exterior window pane to form an air-film vibration damping system therewith, in which the intermediate layer is not perfectly planar.

Referring now to FIG. 9, another alternative window structure is generally designated by the reference numeral 400. An exterior window structural member 410 is in contact with the external environment 424, while an interior window structural member 412 is in contact with an interior environment 426. An intermediate member 414 provides air-film vibration damping characteristics with respect to the external window member 410. In FIG. 9, the intermediate member 414 is not planar along its entire surface area (or distance as seen in FIG. 9) and has a gap dimension G41 providing the air-film vibration damping in a space 420. Toward one end of the window structure, the gap distance G41 is not maintained and intermediate member 414 comes close to, or makes contact with, the surface of the exterior window member 410.

The exterior window member 410 has a thickness of dimension d41, the interior window member 412 has a thickness dimension d42, and the intermediate member 414 has a thickness dimension d43. Another gap (or space) 422 has a dimension G42, while the overall larger gap G43 represents the distance between the two main structural window members 410 and 412. The vibration damping characteristics of this embodiment 400 may be somewhat different than those of the embodiment 200 in FIG. 5, and this alternative construction may also prove useful for other reasons.

Figure 10:
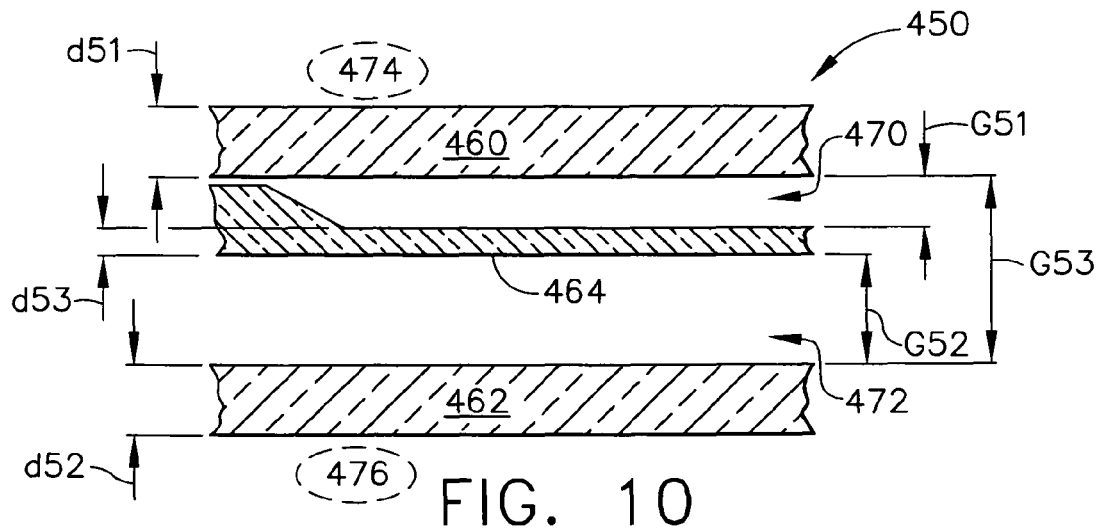
FIG. 10 is a cross-section view of a window constructed according to the principles of the present invention, in which an intermediate layer of material is positioned proximal to an exterior window pane to form an air-film vibration damping system therewith, in which the intermediate layer is not perfectly planar, and in which the intermediate layer does not exhibit the same thickness throughout.

Referring now to FIG. 10, yet another alternative embodiment 450 of a window structure is provided, in which an exterior member 460 is in contact with the exterior environment 474, an interior member 462 is in contact with the interior environment 476, and there is an intermediate member 464 that does not exhibit a constant thickness. A gap (or space) 470 provides air-film vibration damping characteristics with respect to the exterior member 460, and this gap has a dimension G51. The thickness of the exterior member 460 is given as d51, while the effective thickness of the intermediate member 464 is given by the dimension d53. This is the lesser thickness dimension of member 464, illustrated in FIG. 10; the thicker portion of intermediate member 464 allows a different type of structural support to be used, and which may come into physical contact with one of the surfaces of the exterior member 460, if desired.

The interior member 464 has a thickness dimension d52, and a thermal barrier gap (or space) 472 has a dimension G52. The overall distance between the two structural main members 460 and 462 is given by the dimension or gap G53.

Figure 11:
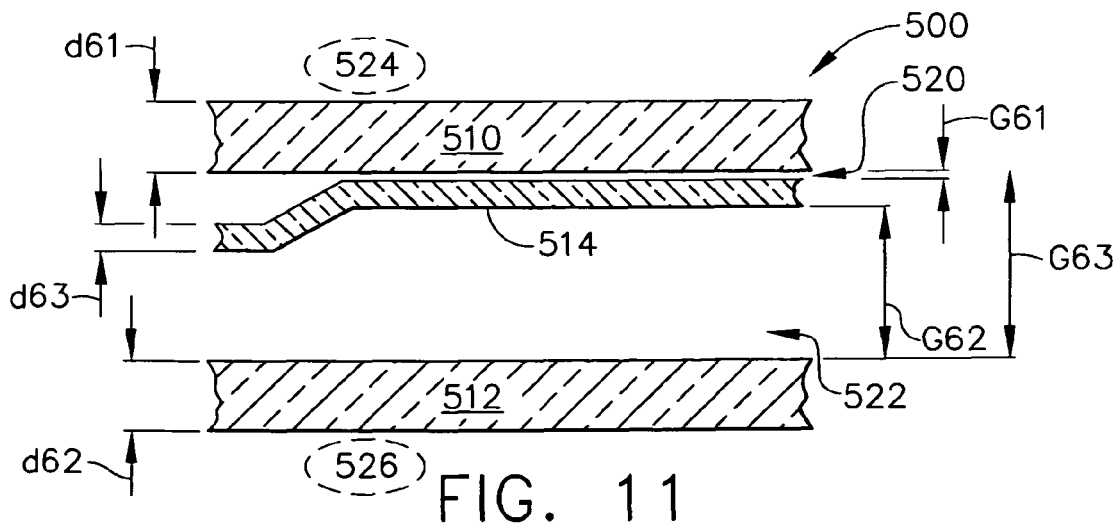
FIG. 11 is a cross-section view of a window constructed according to the principles of the present invention, in which an intermediate layer of material is positioned proximal to an exterior window pane to form an air-film vibration damping system therewith, in which the intermediate layer is not perfectly planar, and the intermediate layer is configured to bend in an opposite direction as compared to that of FIG. 9.

Referring now to FIG. 11, still another alternative embodiment 500 is illustrated as having a main exterior member 510 that is in contact with the exterior environment 524, a main interior member 512 that is in contact with the interior environment 526, and an intermediate member 514 that provides an air-film vibration damping characteristic with respect to the exterior member 510. Intermediate member 514 provides a spaced-apart gap G61 in a space 520 between members 510 and 514. This allows for air-film vibration damping to take place. The outer window member 510 has a thickness dimension d61, the interior window member 512 has a thickness dimension d62, and the intermediate member 514 has a thickness d63. This can be seen in FIG. 11, intermediate member 514 is not planar over its entire surface area (or length across the figure), but zigs a bit farther away from the exterior window member 510, which may allow for it to be more easily mounted into the window frame of the fuselage of an aircraft, for example.

The gap dimension G61 provides the air-film vibration damping characteristic, and a gap G62 can provide thermal insulation, for a volume (or space) 522. The overall gap dimension G63 is between the two main structural window members 510 and 512.

It will be understood that the principles of the present invention can apply to various types of window structures, including window structures that have a large air gap between two substantially transparent window pane members, and also window structures that have some type of solid material between two window pane members, such as an interlayer of a substantially transparent solid material. For the present invention to be effective, however, there must be some type of space or gap between at least two of the window structure members, and this space or gap would typically be filled with some gaseous compound to provide the "air-film" vibration damping effect.

It will also be understood that the panes of the inventive window structure may or may not include one or more through-holes to provide equalization of air pressure on both sides. Such through-holes could potentially even be located in a relatively thin layer of material that is provided specifically as a boundary for the space (or gap) that provides the air-film vibration damping effect of the present invention. Of course, if one of the window structure layers includes a through-hole that would be in communication with the space (or gap) that is providing the vibration damping characteristic, then the effects of this through-hole must be accounted for by the system designer.

It will yet be further understood that the additional layer of material that provides the space (or gap) for the air-film vibration damping characteristic would typically be substantially clear or transparent at wavelengths of visible light to the human eye. However, not every portion of the window structure would necessarily need to comprise a material having a substantially transparent characteristic. This would be true for all of the window members, and the use of a non-transparent material at certain areas may particularly be useful around the edges of the window structures, or in certain corners, if desired by the system designer.

It will still be further understood that the material used within the space or gap that is providing the air-film vibration damping characteristic of the overall window structure or system does not necessarily have to be air, but could be virtually any type of gaseous compound that would provide the proper physical characteristics to enhance the vibration damping effect. If air is not used, then other gaseous materials such as argon or neon could be used, or perhaps other materials such as a gas that is high in nitrogen content, or high in one of the other noble gases.

As used herein, the term "proximal" can have a meaning of closely positioning one physical object with a second physical object, such that the two objects are perhaps adjacent to one another, although it is not necessarily required that there be no third object positioned therebetween. In the present invention, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

All documents cited in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. A vibration damping system, comprising:
a window structure that comprises two separate layers of material that are both substantially transparent at visible optical wavelengths for humans, said two separate layers being spaced-apart from one another by a first distance in an arrangement by which at least portions of said two separate layers are substantially parallel to one another, thereby forming a space between said two separate layers of material of said window structure in which said space includes a gaseous material;
wherein said first distance is in the range of 0.001 inches (0.025 mm) to 0.050 inches (1.27 mm), inclusive so as to provide air-film vibration damping for said window structure; and wherein said thickness of the two separate layers of material is in the range of 0.050 inches (1.27 mm) to 1.00 inches (25.4 mm), inclusive.

2. The vibration damping system as recited in claim 1, wherein at least one of said two separate layers of material exhibits an opening that extends completely therethrough, used for pressure equalization with an environment.

3. The vibration damping system as recited in claim 1, wherein said layers of material exhibit a substantially uniform thickness over their entire area.

4. The vibration damping system as recited in claim 1, wherein said first distance is in the range of 0.005 inches (0.127 mm) to 0.016 inches (0.406 mm), inclusive; and wherein the thickness of one of said two separate layers of material is in the range of 0.105 inches (2.667 mm) to 0.220 inches (5.588 mm), inclusive.

5. A vibration damping system, comprising:
a window structure that comprises two separate layers of material, a first layer and a second layer, that are both substantially transparent at visible optical wavelengths for humans, said two separate layers being spaced-apart from one another by a first distance in an arrangement by which at least portions of said two separate layers are substantially parallel to one another, thereby forming a space between said two separate layers of material of said window structure in which said space includes a gaseous material;
at least a portion of a fuselage, having an internal pressurized cabin environment;
said first layer being mounted on said at least a portion of a fuselage adjacent to an external environment; and
said second layer being mounted on said at least a portion of a fuselage adjacent to said internal pressurized cabin environment, said second layer having at least one opening that extends completely therethrough to allow pressure to substantially equalize between said internal pressurized cabin environment and said space, such that said space will contain said gaseous material substantially at cabin environment pressure;
wherein: (a) said first distance is less than one-quarter inch (6.3 mm) and sized so as to provide air-film vibration damping for said window structure; and (b) said two separate layers of material both exhibit a thickness that is significantly greater than said first distance.

6. The vibration damping system as recited in claim 5, wherein said gaseous material is used as a vibration damping medium.

7. The vibration damping system as recited in claim 5, wherein said layers of material exhibit a substantially uniform thickness over their entire area.

* * * * *